United States Patent
Aijazi et al.

(10) Patent No.: US 10,462,624 B1
(45) Date of Patent: Oct. 29, 2019

(54) DATA BINGE DETECTION

(71) Applicant: Google LLC, Mountain View, CA (US)

(72) Inventors: Ammar Aijazi, Mountain View, CA (US); Kelsey Stratton, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/252,863

(22) Filed: Jan. 21, 2019

(51) Int. Cl.
*H04W 4/24* (2018.01)
*H04M 15/00* (2006.01)
*H04M 15/28* (2006.01)

(52) U.S. Cl.
CPC ............ *H04W 4/24* (2013.01); *H04M 15/28* (2013.01); *H04M 15/8358* (2013.01); *H04M 15/88* (2013.01)

(58) Field of Classification Search
CPC ...................................................... H04W 4/20
See application file for complete search history.

(56) References Cited

U.S. PATENT DOCUMENTS

| | | |
|---|---|---|
| 9,419,735 B2 | 8/2016 | McCrea |
| 9,769,643 B2 | 9/2017 | Baron et al. |
| 2011/0125063 A1* | 5/2011 | Shalon .................. A61B 5/0006 600/590 |

* cited by examiner

*Primary Examiner* — Diane D Mizrahi
(74) *Attorney, Agent, or Firm* — Honigman LLP; Brett A. Krueger

(57) ABSTRACT

A method for detecting an accidental data binge includes obtaining a data usage category of a user equipment (UE) device based on historical data usage for the UE device over a cellular network, the data usage category associated with a binge data threshold. The method also includes receiving an amount data consumed by the UE device over the cellular network and determining whether the amount of the data consumed by the UE device within a threshold period of time satisfies the binge data threshold. The method also includes determining that the amount of the data consumed by the UE device within the threshold period of time may be accidental and instructing the UE device to output a notification indicating that the amount of the data consumed by the UE device over the cellular network may be accidental.

32 Claims, 6 Drawing Sheets

DATA BINGE DETECTION

TECHNICAL FIELD

This disclosure relates to data binge detection.

BACKGROUND

Mobile network operators using cellular communication networks provide communication content such as voice, video, packet data, messaging, and broadcast for subscriber devices, such as mobile devices and data terminals. Often, subscriber devices are given an allotment (e.g., monthly allotment) or quota of data to consume. Typically, the subscriber device accrues additional charges if the device exceeds this allotment or quota. Alternatively, subscriber devices use a metered data connection where charges accrue for only data actually consumed. Some communication content, such as high-definition video, may consume data at a high rate.

SUMMARY

One aspect of the disclosure provides a method for detecting an accidental data binge. The method includes obtaining, at data processing hardware of a user equipment (UE) device, a data usage category of the UE device based on historical data usage for the UE device over a cellular network. The data usage category is associated with a binge data threshold. The method also includes receiving, at the data processing hardware, an amount of data consumed by the UE device over the cellular network and determining, by the data processing hardware, whether the amount of the data consumed by the UE device over the cellular network within a threshold period of time satisfies the binge data threshold. When the amount of the data consumed by the UE device over the cellular network within the threshold period of time satisfies the binge data threshold, the method includes determining, by the data processing hardware, that the amount of the data consumed by the UE device over the cellular network within the threshold period of time may be accidental. The method also includes instructing, by the data processing hardware, the UE device to output a notification. The notification indicates that the amount of the data usage consumed by the UE device over the cellular network may be accidental.

Implementations of the disclosure may include one or more of the following optional features. In some implementations, obtaining the data usage category of the UE device includes executing a data monitor on the data processing hardware. The data monitor may be configured to select the data usage category of the UE device based on an amount of historical data consumed by the UE device over the cellular network within a predetermined period of time. The data usage category is selected from a tiered group of two or more data usage categories and each data usage category in the tiered group of the two or more data usage categories is associated with a corresponding range of data consumption and a corresponding binge data threshold. The method may also include identifying the corresponding binge data threshold associated with the selected data usage category. In some examples, data usage categories in the tiered group of the two or more data usage categories associated with higher corresponding ranges of data consumption are associated with higher corresponding binge data thresholds than data usage categories in the tiered group of the two or more data usage categories associated with lower corresponding ranges of data consumption. The predetermined period of time, in some implementations, is greater than the threshold period of time. The method may further include, when the amount of the data consumed by the UE device over the cellular network within the threshold period of time satisfies the data binge threshold, throttling, by the data processing hardware, bandwidth of the data consumed by the UE device over the cellular network. Optionally, the method includes receiving, at the data processing hardware, an indication of consent to throttling from a user of the UE device. The method, in some examples, further includes determining, by the data processing hardware, an accuracy of the binge data threshold based on at least one of a number determined accidental data usages or a number of support requests created by the user of the UE device. The method may also include adjusting, by the data processing hardware, the binge data threshold of the UE device based on a data connection type of the UE device. For example, the connection type of the UE device includes the UE device tethered to another device. In some implementations, the method includes adjusting, by the data processing hardware, the binge data threshold associated with the data usage category of the UE device based on an application currently executing on the UE device. The method may include adjusting, by the data processing hardware, the binge data threshold associated with the data usage category of the UE device based on a location of the UE device. Optionally, the method includes adjusting, by the data processing hardware, the binge data threshold associated with the data usage category of the UE device based on nearby Wi-Fi networks that the UE device has previously connected to. In some examples, the method further includes, after instructing the UE device to output the notification, receiving, at the data processing hardware, a notification snooze request from the user of the UE device. In response to receiving the notification snooze request, the method includes delaying, by the data processing hardware, output of notifications by the UE device for a notification delay threshold period of time. In some implementations, the method includes adjusting, by the data processing hardware, the binge data threshold associated with the data usage category of the UE device based on inputs received from the user of the UE device. In some examples, the method further includes transmitting, by the data processing hardware, an indication that the amount of the data consumed by the UE device over the cellular network may be accidental to a remote system. The remote system may be another UE device.

Another aspect of the disclosure provides a system that includes data processing hardware of a user equipment (UE) device and memory hardware in communication with the data processing hardware. The memory hardware stores instructions that when executed on the data processing hardware cause the data processing hardware to perform operations including obtaining a data usage category of the UE device based on historical data usage for the UE device over a cellular network. The data usage category is associated with a binge data threshold. The operations also include receiving an amount of data consumed by the UE device over the cellular network and determining whether the amount of the data consumed by the UE device over the cellular network within a threshold period of time satisfies the binge data threshold. When the amount of the data consumed by the UE device over the cellular network within the threshold period of time satisfies the binge data threshold, the operations include determining that the amount of the data consumed by the UE device over the cellular network within the threshold period of time may be accidental. The operations also include instructing the UE device to output a notification. The notification indicates that the amount of the data usage consumed by the UE device over the cellular network may be accidental.

This aspect may include one or more of the following optional features. In some implementations, obtaining the data usage category of the UE device includes executing a data monitor on the data processing hardware. The data monitor may be configured to select the data usage category of the UE device based on an amount of historical data consumed by the UE device over the cellular network within a predetermined period of time. The data usage category is selected from a tiered group of two or more data usage categories and each data usage category in the tiered group of the two or more data usage categories is associated with a corresponding range of data consumption and a corresponding binge data threshold. The operations may also include identifying the corresponding binge data threshold associated with the selected data usage category. In some examples, data usage categories in the tiered group of the two or more data usage categories associated with higher corresponding ranges of data consumption are associated with higher corresponding binge data thresholds than data usage categories in the tiered group of the two or more data usage categories associated with lower corresponding ranges of data consumption. The predetermined period of time, in some implementations, is greater than the threshold period of time. The operations may further include, when the amount of the data consumed by the UE device over the cellular network within the threshold period of time satisfies the data binge threshold, throttling bandwidth of the data consumed by the UE device over the cellular network. Optionally, the operations include receiving an indication of consent to throttling from a user of the UE device. The operations, in some examples, further include determining an accuracy of the binge data threshold based on at least one of a number determined accidental data usages or a number of support requests created by the user of the UE device. The operations may also include adjusting the binge data threshold of the UE device based on a data connection type of the UE device. For example, the connection type of the UE device includes the UE device tethered to another device. In some implementations, the operations include adjusting the binge data threshold associated with the data usage category of the UE device based on an application currently executing on the UE device. The operations may include adjusting the binge data threshold associated with the data usage category of the UE device based on a location of the UE device. Optionally, the operations include adjusting the binge data threshold associated with the data usage category of the UE device based on nearby Wi-Fi networks that the UE device has previously connected to. In some examples, the operations further include, after instructing the UE device to output the notification, receiving a notification snooze request from the user of the UE device. In response to receiving the notification snooze request, the operations include delaying output of notifications by the UE device for a notification delay threshold period of time. In some implementations, the operations include adjusting the binge data threshold associated with the data usage category of the UE device based on inputs received from the user of the UE device. In some examples, the operations further include transmitting an indication that the amount of the data consumed by the UE device over the cellular network may be accidental to a remote system. The remote system may be another UE device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Subscribers to some mobile network operators (MNOs) only pay for mobile cellular data that the subscribers use (i.e., no overage charges). This allows the subscribers to use data freely without regard to wasting unused data or excessive overage charges. However, subscribers may occasionally experience a significant increase in cellular data usage because the subscriber, for example, accidently streams a high-definition (HD) video via cellular data (e.g., when the subscriber thought Wi-Fi was enabled or the subscriber thought tethering was disabled). This accidental increase in data usage may result in a surprisingly high bill for the user which in turn increases complaints to customer support of the MNO and potentially an increase in refunds for the data usage.

Figure 1:
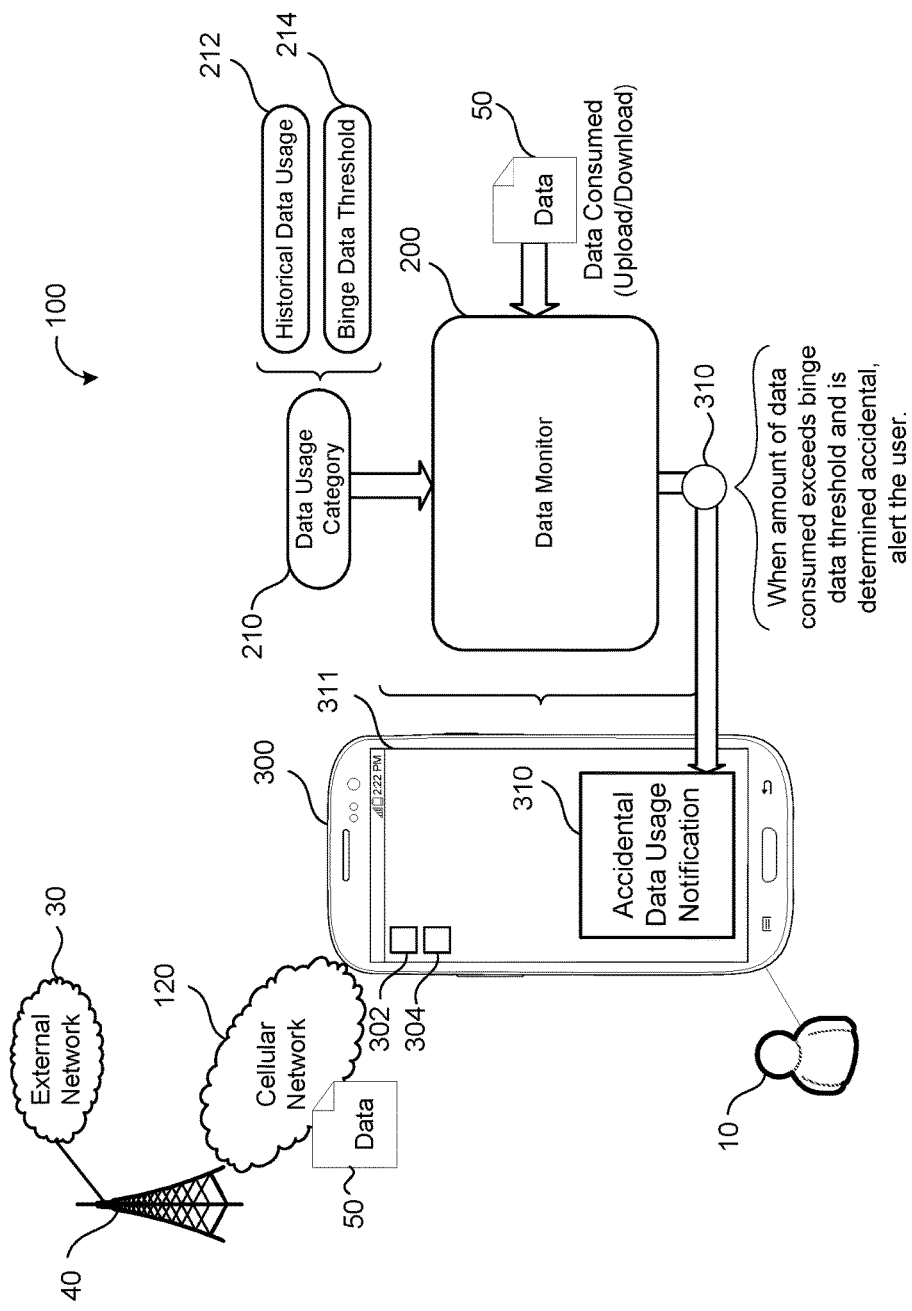
FIG. 1 is a schematic view of an example wireless communication environment.

Implementations herein are directed toward a data monitor 200 that executes on a user equipment (UE) device 300 for detecting accidental binge data use by the UE device 300 over a cellular network 120 and responding to the binge appropriately by notifying a user 10 associated with the UE device 300. The data monitor 200 may include a trained model (e.g., via machine learning) configured to detect when data 50 consumed by a UE device 300 over a cellular network 120 is indicative of an accidental data binge. Referring to FIG. 1, in some implementations, an example wireless communication environment 100 includes a UE device 300 in communication with an external network 30 through a cellular network 120 (i.e., a mobile network). The external network 30 may include a packet data network (PDN), which may be the Internet. The cellular network 101 may include a General Packet Radio Service (GPRS) network, a Universal Mobile Telecommunications System (UMTS) network, a High Speed Packet Access (HSPA) network, an enhanced-HSPA (H+) network, an Enhanced Data Rates for Global System for Mobile communications (GSM) (EDGE) network, or a Long-Term Evolution (LTE) radio access network (RAN) (e.g., 4G/5G LTE) that supports radio communication of data packets 50 and/or other services from the external network 30 to the UE device 300 via one or more base stations 40, such as macro-cell evolved Node B's (MeNB). The cellular network 120 is associated with a mobile network operator (MNO) that provides services of wireless communications to the subscribing UE device 300 via the cellular network 120. The MNO may also be referred to as a wireless service provider, wireless carrier, cellular company, or mobile network carrier. Accordingly, the terms cellular network 120, mobile network, and MNO may be used interchangeably herein. While the UE device 300 is depicted as a mobile device 300 in the example shown, the UE device 300 can include any device capable of connecting to the cellular network 120 such as, without limitation, a tablet, laptop, smart watch, smart speaker, etc.

The UE device 300 includes computing resources 302 (e.g., data processing hardware) and/or storage resources 304 (e.g., memory hardware). The data processing hardware 302 executes a graphical user interface (GUI) 311 and a data monitor 200. The data monitor 200 obtains a data usage category 210 based on historical data usage 212 by the UE device 300 over the cellular network 120 and associated with a corresponding binge data threshold 214. As discussed in more detail below, the data monitor 200 is configured to determine an amount of data 50 consumed by the UE device 300 over the cellular network 120 that is indicative of a potential accidental data binge when the amount of data 50 consumed by the UE device 300 over the cellular network 120 satisfies the corresponding binge data threshold 214 associated with the obtained data usage category 210. The data monitor 200 may receive an amount of data consumed by the UE device 300 over the cellular network 120. Alternatively, the data monitor 200 may monitor the actual data usage (upload and download) of the UE device 300 to determine an amount of data consumed by the UE device 300 over the cellular network 120. In some examples, when the data monitor 200 determines the amount of data 50 consumed by the UE device 300 over the cellular network 120 is indicative of the accidental data binge, the data monitor 200 instructs the UE device 300 to output a notification 310. Here, the notification 310 alerts the user 10 of the UE device 300 that UE device 300 has just recently uploaded and/or downloaded an excessive amount of data 50 over the cellular network 120. As used herein, the term "excessive amount of data" refers to an uncharacteristically high amount of data 50 consumed by the UE device 300 over the cellular network 120 relative to the historical data usage 212 by the UE device 300 over the cellular network 120. Thus, the notification 310 may serve to apprise the user 10 that the UE device 300 is connected to the cellular network 120 and consuming high or unusual amounts of data 50 in scenarios where, for example, the user 10 is under the belief that the UE device 300 is connected to Wi-Fi, and not subject to data usage charges by the MNO, so that the user 10 can make the decision to switch to a Wi-Fi connection if available, cease consuming data 50 over the cellular network 120, or continue consuming data 50 over the cellular network 120. In the case of the latter, the user 10 acknowledges that the data 50 consumed over the cellular network 120 will be subject to data usage charges by the MNO. By contrast, when the amount of data 50 consumed by the UE device 300 over the cellular network 120 does not satisfy the corresponding binge data threshold 214, the data monitor 200 determines that the amount of data 50 consumed by the UE device 300 over the cellular network 120 is intentional, and thereby refrains from notifying the user 10. As used herein, data 50 consumed by the UE device 300 over the cellular network 120 refers to a magnitude of data 50 (e.g., megabytes (MB) or gigabytes (GB)) uploaded and/or downloaded by the UE device 300 over the cellular network 120. The data monitor 200 executing on the UE device 300 may be similarly configured to monitor data consumed by the UE device 300 over networks other than the cellular network 120 associated with the MNO such as small-cell networks managed by other operators or providers, or the same MNO but subject to a different fee structure.

Figure 2:
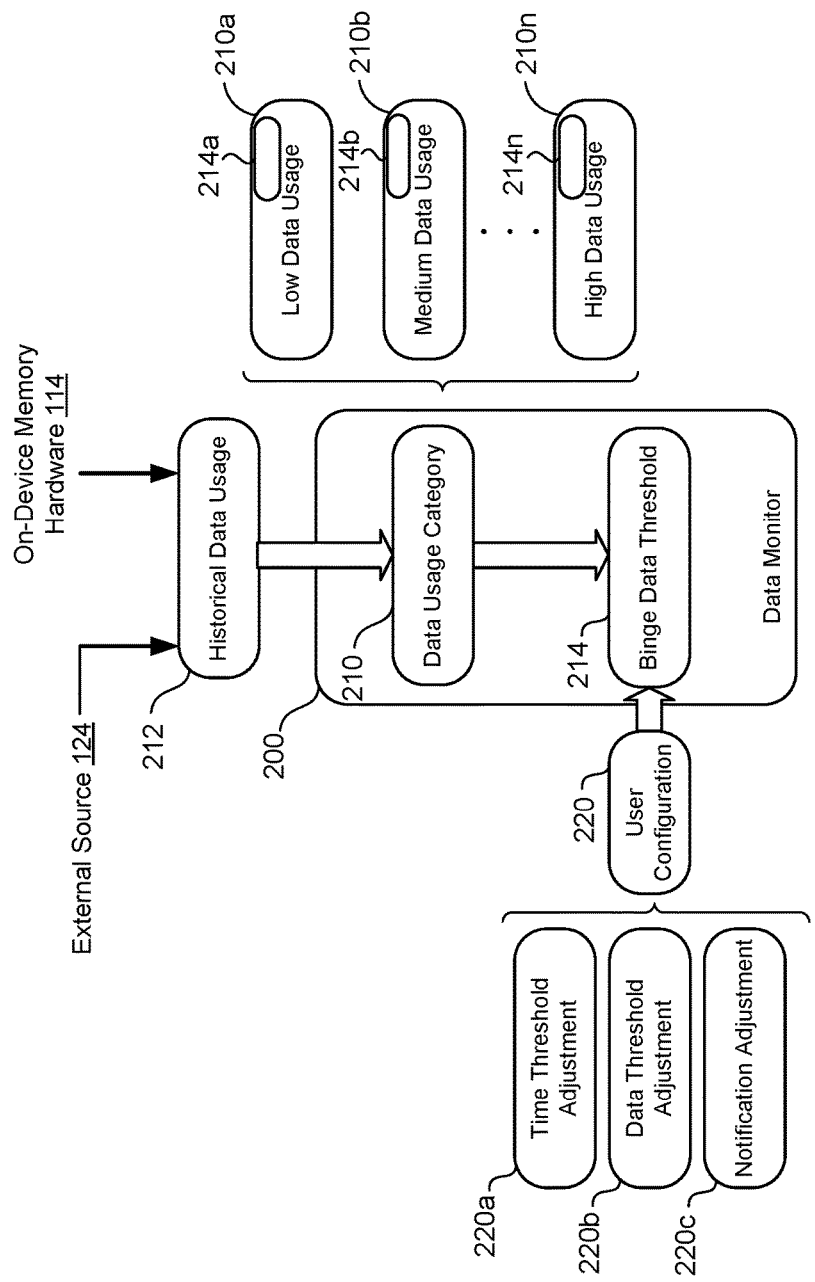
FIG. 2 is a schematic view of example components of a data monitor that executes on a user equipment (UE) device for detecting accidental binge data use by the UE device over a cellular network.

Referring now to FIG. 2, the data monitor 200 receives the historical data usage 212 of the UE device 300. The historical data usage 212 represents an amount of historical data previously consumed by the UE device 300 within a predetermined period of time. For example, the predetermined period of time may be a previous billing cycle of the UE device 300 (e.g., one month) and the historical data usage 212 may represent the amount of data consumed by the UE device 300 during the previous billing cycle. In some examples, the historical data usage 212 is based on a statistical amount of data 50 consumed by the UE device 300 within a predetermined period of time. For instance, the historical data usage 212 may represent the average/median amount of data 50 consumed by the UE device 300 over two or more previous billing cycles. In some implementations, the data monitor 200 obtains the historical data usage 212 from an external source 124, such as a remote system associated with the MNO of the cellular network 120 (e.g., an electronic billing statement providing data usage over the cellular network 120). In other implementations, the UE device 300 stores the historical data usage 212 on the on-device memory hardware 304 and the data monitor 200 obtains the historical data usage 212 by retrieving the historical data usage 212 directly from the memory hardware 304 of the UE device 300. That is, the data monitor 200 (or other applications executed on the data processing hardware 302) may track or monitor data usage and determine an appropriate data usage category 210 to select for the UE device 300.

The data usage category 210 of the UE device 300 is based on the historical data usage 212 consumed by the UE device 300. In some implementations, the data monitor 200 obtains the data usage category 210 by selecting the data usage category 210 from a tiered group of two or more data usage categories 210, 210a-n. For example, the tiered group of data usage categories 210 may include a low data usage category 210a, a medium data usage category 210b, and a high data usage category 211n. While the example shown depicts three data usage categories 210 in the tiered group, the tiered group could include one data usage category 210, two data usage categories 210, or more than three data usage categories 210 in other examples. Each data usage category 210 is associated with a corresponding range of data consumption and a corresponding binge data threshold 214, 214a-n. For example, the low data usage category 210a may be associated with users 10 who consume less than two (2) gigabytes of data a month on average and a corresponding binge data threshold 214a of 200 megabytes. That is, more than 200 megabytes of cellular data 50 consumed by the UE device 300 associated with the user 10 within, for example, an hour may constitute a potential accidental data binge. Accordingly, the binge data threshold 214 is associated with the amount of cellular data 50 that must be consumed by the UE device 300 within a threshold period of time to constitute a potential accidental data binge. That is, when the data monitor 200 determines that the binge data threshold 214 has been satisfied, the data monitor 200 determines that the data usage may be accidental. Thus, selecting the data usage category 210 associated with the UE device 300 results in selection of a corresponding binge data threshold 214 to apply for determining whether or not data 50 consumed by the UE device 300 over the cellular network 120 is indicative of an accidental data binge. The predetermined period of time associated with the historical data usage 212, in some examples, is greater than the threshold period of time associated with the binge data threshold 214. For example, the binge data threshold 214 may apply to the previous hour of data usage. A higher data usage category 210 (i.e., a UE device 300 that historically consumes a higher amount of cellular data 50) may be associated with a higher binge data threshold 214, while a correspondingly lower data usage category 210 may be associated with a lower binge data threshold 214.

The threshold period of time associated with the binge data threshold 214 may span predetermined periods of time or be a sliding window. For example, when the threshold period of time is one hour, the threshold period of time may span only whole hours. That is, when the current time is 9:18 AM, the threshold period of time would span from 8 AM to 9 AM or when the current time is 6:30 PM, the threshold period of time would span from 5 PM to 6 PM. However, a sliding window spans from the current time to the threshold period of time prior to the current time. For example, if the threshold period of time is one hour, and the current time is 9:18 AM, the threshold period of time spans from 8:18 AM to the current time (i.e., 9:18 AM) and this window continues to "slide" as time progresses. The data monitor may monitor for a data binge continuously, at regular time intervals (e.g., once a minute, once every fifteen minutes, etc.), or in response to external inputs (e.g., data usage, user inputs, etc.).

With continued reference to FIG. 2, the selected binge data threshold 214 may be adjusted or otherwise configured via a user configuration input 220, 220a-220n. For example, the user 10 of the UE device 300 may provide a time threshold adjustment 220a (e.g., instead of encompassing the previous hour of data usage, the user 10 may adjust the binge data threshold 214 to encompass the previous 30 minutes of data usage). The user 10 may also provide a data threshold adjustment 220b. That is, the user 10 may adjust the amount of data associated with the binge data threshold 214 (e.g., change the threshold from one (1) gigabyte of data to 500 megabytes of data). As another example, the user 10 may also customize or configure the notification 310 (e.g., how long the notification 310 will display, acknowledgement options, etc.) when an amount of data 50 consumed by the UE device 300 over the cellular network 120 is indicative of the accidental data binge.

Figure 3B:
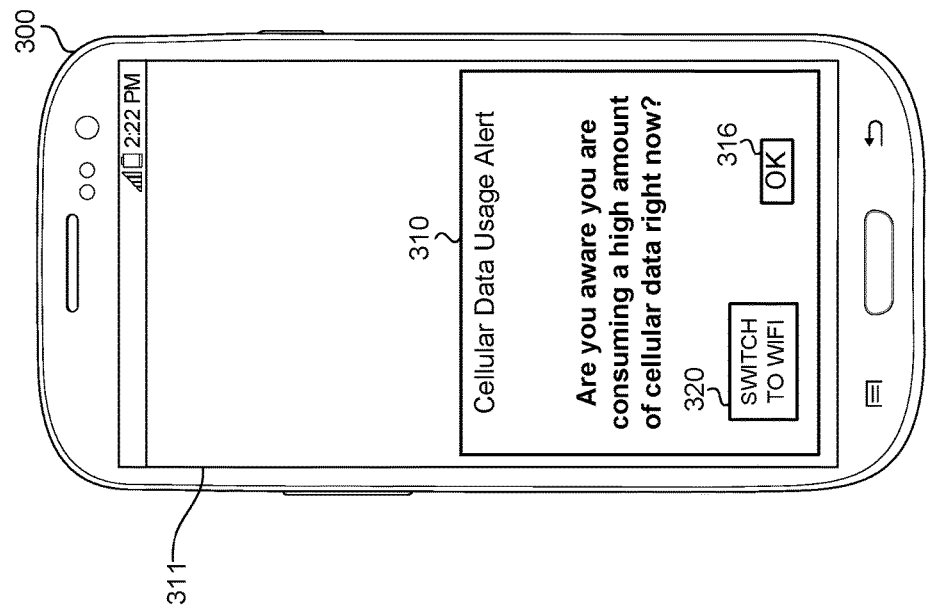
FIGS. 3A and 3B are schematic views of exemplary notifications on a UE device.
Figure 3A:
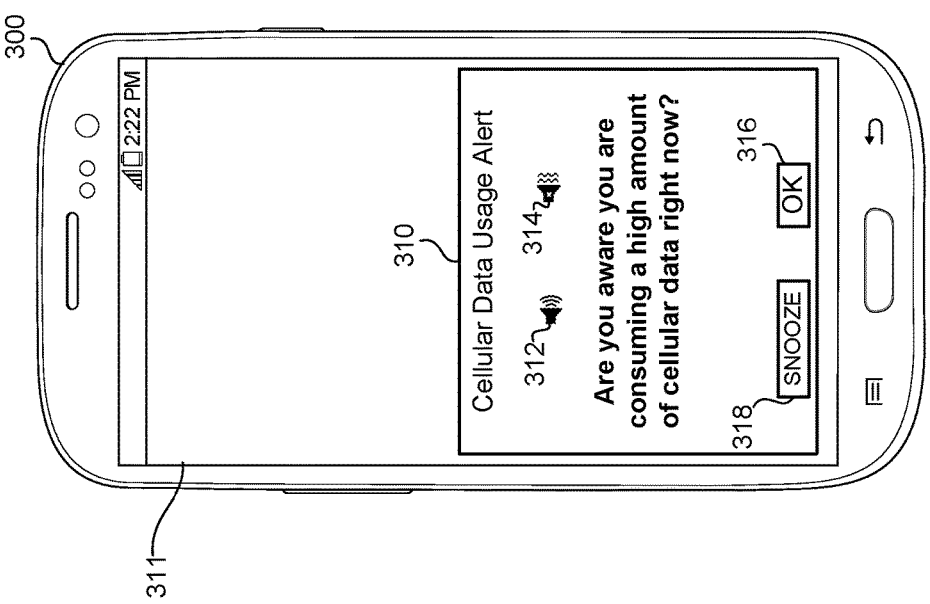

Referring now to FIGS. 3A and 3B, the data processing hardware 302 may cause the UE device 300 to display the notification 310 (or alert) on the GUI 311 to alert the user 10 of the potential accidental data usage and to allow the user 10 to take appropriate action if the data usage is accidental. The notification 310 may overlay or interrupt any application 410 (FIG. 4) currently executing on the UE device 300. Additionally or alternatively, FIG. 3A shows that the notification 310 may include an audible notification 312 and/or a vibratory notification 314. The notification 310 may include a confirmation button 316 for the user 10 to select to acknowledge the notification 310. The user 10 could similarly acknowledge the notification 310 by providing an audible input (e.g., speaking) or simply gazing at the confirmation button 316 or some other graphical feature displayed on the UE device 300. In some examples, the notification 310 may include a snooze button 318 displayed on the GUI 311 of FIG. 3A. The snooze button 318 may allow the user 10 to defer the current or future notification 310 for a predetermined or user configurable period of time. For example, the snooze button 318 may cause the data monitor 200 to refrain from instructing the UE device 300 to display a notification 310 for a period of one hour. As shown in FIG. 3B, the notification 310 may also include a prompt 320 to switch from the connection to the cellular network 120 to, for example, another wireless network such as Wi-Fi. Selecting the prompt 20 may present the user 10 with a list of Wi-Fi networks within range to select or automatically connect to a previously used network. In some implementations, the binge data threshold 214 is based on nearby Wi-Fi networks that the UE device 300 has previously connected to. For example, if the UE device 300 detects that there are Wi-Fi networks within range that are commonly used by the UE device 300, the binge data threshold 214 may be reduced. In some implementations, the location of the UE device 300 (obtained, for example, via a global positioning service (GPS) of the UE device 300) affects the binge data threshold 214. For example, when the UE device 300 determines that the UE device 300 is near a location where cellular data 50 is typically not heavily consumed (e.g., a home), the binge data threshold 214 may be reduced. As another example, the UE device 300 may adjust the binge data threshold 214 in response to international travel. In yet other examples, the data monitor 200 throttles bandwidth of data 50 consumed by the UE device 300 over the cellular network 120 in response to detecting the accidental data binge in order to mitigate the amount of data 50 consumed by the UE device 300 over the metered cellular network 120 until, for example, the user 10 is notified via the notification 310. The UE device 300 may prompt the user 10 for consent to throttling before taking such action (e.g., before a notification 310 is received or in the notification 310 itself).

In some examples, the data monitor 200 avoids duplicate notifications 310. A duplicate notification 310 is a notification about a data binge for which the data monitor 200 has already notified the user 10. For example, if a user 10 streams a video over the cellular network 120 at 12:30 PM that generates a notification 310, the data binge threshold 214 of the user 10 has been exceeded. If the data monitor 200, at 12:45 PM, again checks data usage, the previous data usage of streaming the video may still be within the threshold period of time and therefore the data monitor 200 will again notify the user 10. In this scenario, the second notification 310 is a duplicate notification 310. To avoid such duplicate notifications 310, the data monitor may refrain from notifying a user 10 for a backoff period of time after generating a notification 310. For example, the data monitor 200 may have a default backoff time period of eight hours. That is, the data monitor 200 will not generate a notification 310 for at least eight hours after the previous notification 310. In other examples, the backoff time period is the same as the threshold period of time associated with the binge data threshold 214 (e.g., one hour). The backoff time period may be user configurable to allow the user 10 to customize how frequently the data monitor 200 may notify the user 10.

Further to the descriptions above, a user 10 may be provided with controls allowing the user 10 to make an election as to both if and when systems, programs or features described herein may enable collection of user information (e.g., user's data usage, user's app usage, or a user's current location), and if the user 10 is sent content or communications from a server. In addition, certain data may be treated in one or more ways before it is stored or used, so that personally identifiable information is removed. For example, a user's identity may be treated so that no personally identifiable information can be determined for the user 10, or a user's geographic location may be generalized where location information is obtained (such as to a city, ZIP code, or state level), so that a particular location of a user 10 cannot be determined. Thus, the user 10 may have control over what information is collected about the user 10, how that information is used, and what information is provided to the user 10.

Figure 4:
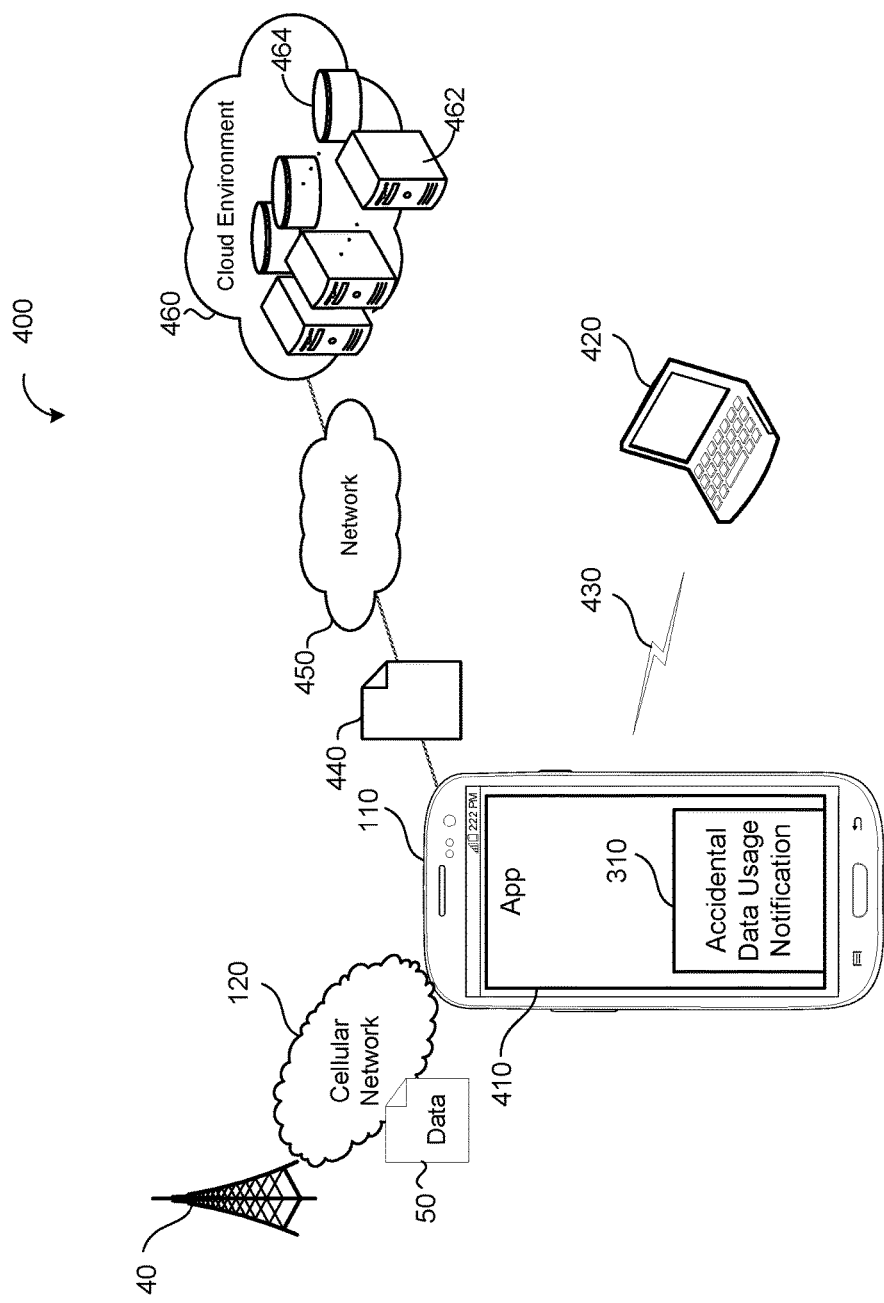
FIG. 4 is a schematic view of another example wireless communication environment.

Referring now to FIG. 4, another example wireless communication environment 400 shows the UE device 300 further basing the binge data threshold 214 on an application (app) 410 executing on the UE device 300. Certain apps 410 are more prone to accidental data binges, and thus the data monitor 200 may respond (e.g., adjust the binge data threshold 214 or the notification 310) to execution of those apps 410. For example, in response to execution of a video streaming application 410, the data monitor 200 may adjust or change the binge data threshold 214 (e.g., because of the typical high data requirements of such applications and the ease of consuming large amounts of cellular data 50 via such applications). In another example, a data tethering app 410 may increase the likelihood of an accidental data binge. Certain applications 410 may also be subject to a separate or different billing rate, and thus warrant an adjusted binge data threshold 214. For example, video streaming from a specific application 410 may be subject to a reduced billing fee. A data connection type of the UE device 300 may also adjust the binge data threshold 214. For example, in some implementations, when the UE device 300 is tethered to another device 420 via a data connection 430, the binge data threshold 214 is adjusted. The tethered data connection 430 may utilize any appropriate wired or wireless protocol (e.g., Wi-Fi, Bluetooth, etc.).

After notifying the user 10 via the notification 310 of an accidental data binge usage, the data monitor 200 may generate a report 440 that includes any details of the data 50 usage over the cellular network 120, the notification 310, or the user's response to the notification 310 (e.g., if the user 10 snoozed the notification 310, if the user 10 switched to Wi-Fi, etc.). The report 440 may be transmitted via network 450 to a remote system 460. The network 450 may correspond to the external network 30 of FIG. 1 and the remote system 460 may correspond to the MNO that manages the cellular network 120. The remote system 460 may be a single computer, multiple computers, or a distributed system (e.g., a cloud environment) having scalable/elastic computing resources 462 (e.g., data processing hardware) and/or storage resources 464 (e.g., memory hardware). In some examples, the remote system is another UE device 300. That is, indication of the unusual data usage may be received by another UE device 300 (e.g., another UE device 300 on the same data plan). The network 450 may be a global communications network, such as the Internet. The UE device 300, in some implementations, communicates with network 450 via an unmetered data connection (e.g., Wi-Fi). Alternatively, the UE device 300 may use the cellular network 120 to communicate the report 440 to the remote system 460. In some examples, the remote system 460 (or the UE device 300) may notify the user 10 via other means (e.g., an email, telephone call, or smart speaker) due to concerns the user 10 may not receive the notification 310 (e.g., because the user 10 is tethered to a laptop and is not actively using the UE device 300 while consuming cellular data 50 or because the user 10 appears to be ignoring notification 310). The remote system 460 may take such actions in response to receiving the report 440 or from receiving a separate notification from the UE device 300.

The remote system 460, in some implementations, determines an accuracy of the binge data threshold 214 based on the generated reports 440. For example, the remote system 460 evaluates the frequency of triggered notifications 310 and the user's 10 response to the notifications 310. The remote system 460 may also use a quantity of support requests created by the user 10 of the UE device 300 to determine the accuracy of the data monitor 200. A support request is any official indication from the customer or user 10 of trouble or displeasure with the service provided by the cellular network 120 (e.g., a surprising data bill). For example, the user 10 may log a complaint via a website of the MNO or the user 10 may call a customer support telephone number to question data charges. The remote system 460 may in turn provide feedback or adjustments or tuning to the data monitor 200. That is, the remote system 460 may adjust, for example, the data usage category 210 (e.g., by adjusting the historical data usage time frames, the size of each data usage category 210, etc.), the binge data threshold 214, or the notification 310, and thus improving the data monitor 200 over time. In some examples, machine learning (i.e., artificial neural networks, Bayesian networks, genetic algorithms, etc.) is used to generate a model that evaluates the accuracy and/or effectiveness of the data monitor 200. The generated reports 440 may serve as training data for the generated model.

Figure 5:
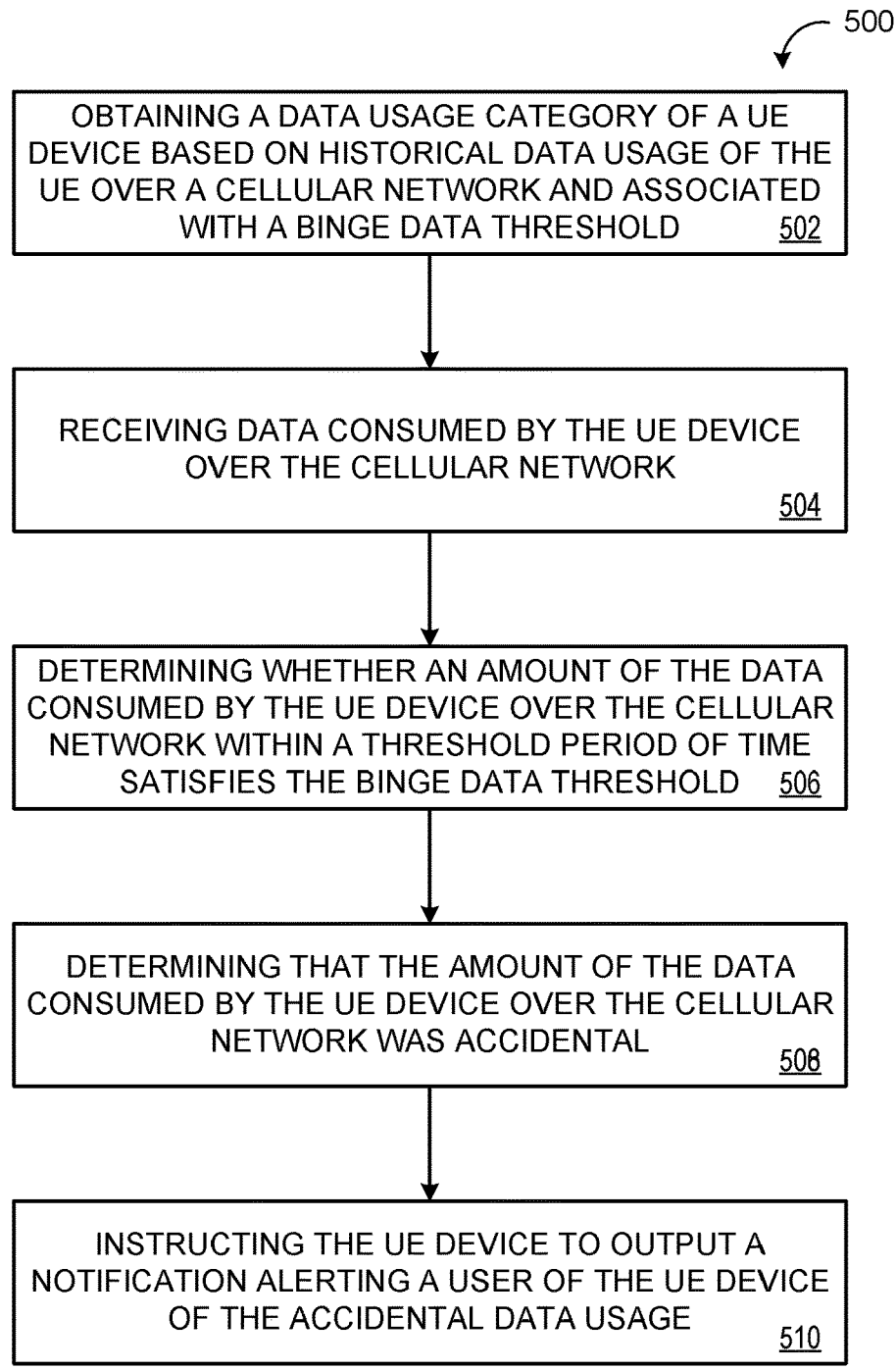
FIG. 5 is a flowchart providing an example method for detecting an accidental data binge by a UE device over a cellular network.

FIG. 5 is a flowchart of an example method 500 for detecting an accidental data binge. The flowchart starts at operation 502 by obtaining, at data processing hardware 302 of a UE device 300, a data usage category 210 of the UE device 300 based on historical data usage 212 for the UE device 300 over a cellular network 120, the data usage category 210 associated with a binge data threshold 214. In some implementations, the method 500 includes adjusting, by the data processing hardware, the binge data threshold 214 associated with the data usage category 210 of the UE device 300 based on a data connection type of the UE device 300. For example, the data connection type may include the UE device 300 tethered to another device 420. In some examples, the binge data threshold 214 associated with the data usage category 210 of the UE device 300 is adjusted, by the data processing hardware, based on an application 410 currently executing on the UE device 300. The binge data threshold 214 associated with the data usage category 210 of the UE device 300 may also be adjusted, by the data processing hardware, based on a location of the UE device 300. In yet another example, the binge data threshold 214 associated with the data usage category 210 of the UE device 300 is adjusted, by the data processing hardware, based on nearby Wi-Fi networks that the UE device 300 has previously connected to. The binge data threshold 214 associated with the data usage category 210 of the UE device 300 may also be adjusted, by the data processing hardware, based on inputs 220 received from the user 10 of the UE device 300.

In some implementations, obtaining the data usage category 210 includes executing a data monitor 200 on the data processing hardware 302. The data monitor 200 is configured to select the data usage category 210 of the UE device 300 based on an amount of historical data 212 consumed by the UE device 300 over the cellular network 120 within a predetermined period of time. The data usage category 210 is selected from a tiered group of two or more data usage categories 210a-n, each data usage category 210a-n in the tiered group of the two or more data usage categories 210a-n is associated with a corresponding range of data consumption and a corresponding binge data threshold 214. The data monitor 200 is also configured to identify the corresponding binge data threshold 214 associated with the selected data usage category 210. Data usage categories 210*a-n* in the tiered group of the two or more data usage categories 210*a-n* associated with higher corresponding ranges of data consumption are associated with higher corresponding binge data thresholds 214 than data usage categories 210*a-n* in the tiered group of the two or more data usage categories 210*a-n* associated with lower corresponding ranges of data. A data usage category 210*a-n* in the tiered group of data usage categories 210*a-n* that is associated with a corresponding range of data consumption that exceeds a corresponding range of data consumption associated with another data usage category 210*a-n* in the tiered group of data usage categories 210*a-n*, in some implementations, includes a corresponding data binge threshold 214 having a magnitude that exceeds a magnitude of a corresponding data binge threshold 214 associated with the other data usage category 210*a-n*. In some examples, the predetermined period of time is greater than the threshold period of time.

The method 500 also includes, at step 504, receiving, at the data processing hardware 302, an amount of data 50 consumed by the UE device 300 over the cellular network 120, and, at step 506, determining, by the data processing hardware 302, whether the amount of the data 50 consumed by the UE device 300 over the cellular network 120 within a threshold period of time satisfies the binge data threshold 214. When the amount of the data 50 consumed by the UE device 300 over the cellular network 120 within the threshold period of time satisfies the binge data threshold 214, at step 508, the method 500 includes determining, by the data processing hardware 302, that the amount of the data 50 consumed by the UE device 300 over the cellular network 120 within the threshold period of time may be accidental and, at step 510, instructing, by the data processing hardware 302, the UE device 300 to output a notification 310, the notification 310 indicating that the amount of the data 50 consumed by the UE device 300 over the cellular network 120 may be accidental.

In some implementations, the method 500 includes, when the amount of the data 50 consumed by the UE device 300 over the cellular network 120 within the threshold period of time satisfies the data binge threshold, throttling, by the data processing hardware 302, bandwidth of the data consumed by the UE device 300 over the cellular network 120. The method 500 may further include receiving, at the data processing hardware 302, an indication of consent to throttling from the user 10 of the UE device 300. In some examples, the method 500 further includes determining, by the data processing hardware 302, an accuracy of the binge data threshold 214 based on at least one of a number determined accidental data usages or a number of support requests created by the user 10 of the UE device 300. Optionally, the method 500 includes, after instructing the UE device 300 to output the notification 310, receiving, at the data processing hardware 302, a notification snooze request from the user 10 of the UE device 300, and, in response to receiving the notification snooze request, delaying, by the data processing hardware, output of notifications 310 by the UE device 300 for a notification delay threshold period of time. Optionally, the method 500 further includes transmitting, by the data processing hardware 302, an indication that the amount of the data 50 consumed by the UE device 300 over the cellular network 120 may be accidental to a remote system 460. The remote system 460 may be another UE device 300.

Figure 6:
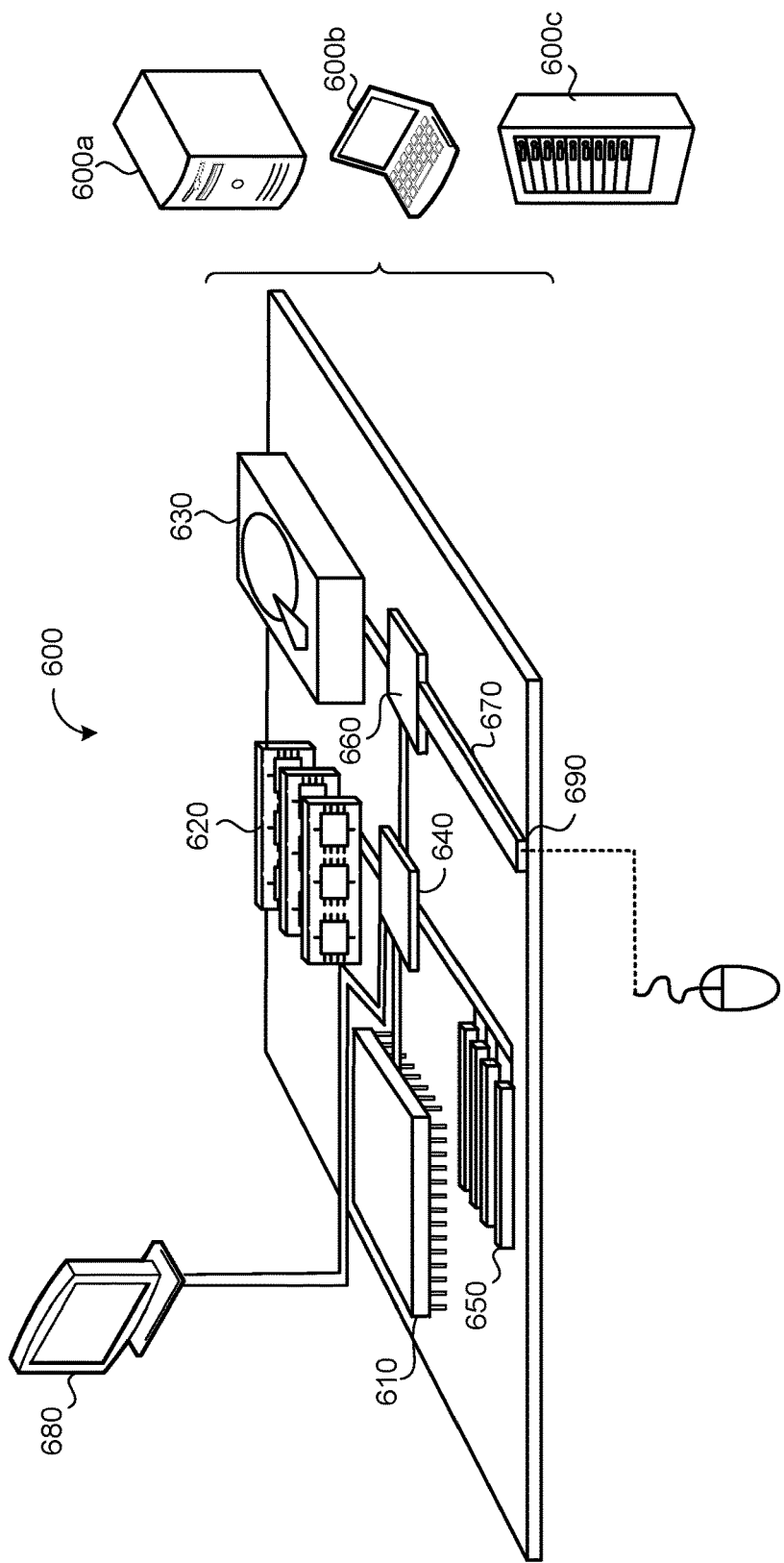
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
obtaining, at data processing hardware of a user equipment (UE) device, a data usage category of the UE device based on historical data usage for the UE device over a cellular network, the data usage category associated with a binge data threshold, the binge data threshold indicating an uncharacteristically excessive amount of data consumed over the cellular network relative to the historical data usage for the UE device over the cellular network;
receiving, at the data processing hardware, an amount of data consumed by the UE device over the cellular network;
determining, by the data processing hardware, whether the amount of the data consumed by the UE device over the cellular network within a threshold period of time satisfies the binge data threshold; and
when the amount of the data consumed by the UE device over the cellular network within the threshold period of time satisfies the binge data threshold:
determining, by the data processing hardware, that the amount of the data consumed by the UE device over the cellular network within the threshold period of time may be accidental; and instructing, by the data processing hardware, the UE device to output a notification, the notification indicating that the amount of the data consumed by the UE device over the cellular network may be accidental.

2. The method of claim 1, wherein obtaining the data usage category of the UE device comprises executing a data monitor on the data processing hardware, the data monitor configured to:
    select the data usage category of the UE device based on an amount of historical data consumed by the UE device over the cellular network within a predetermined period of time, the data usage category selected from a tiered group of two or more data usage categories, each data usage category in the tiered group of the two or more data usage categories is associated with a corresponding range of data consumption and a corresponding binge data threshold; and
    identify the corresponding binge data threshold associated with the selected data usage category.

3. The method of claim 2, wherein data usage categories in the tiered group of the two or more data usage categories associated with higher corresponding ranges of data consumption are associated with higher corresponding binge data thresholds than data usage categories in the tiered group of the two or more data usage categories associated with lower corresponding ranges of data consumption.

4. The method of claim 2, wherein the predetermined period of time is greater than the threshold period of time.

5. The method of claim 1, further comprising, when the amount of the data consumed by the UE device over the cellular network within the threshold period of time satisfies the data binge threshold, throttling, by the data processing hardware, bandwidth of the data consumed by the UE device over the cellular network.

6. The method of claim 5, further comprising receiving, at the data processing hardware, an indication of consent to throttling from a user of the UE device.

7. The method of claim 1, further comprising, determining, by the data processing hardware, an accuracy of the binge data threshold based on at least one of a number determined accidental data usages or a number of support requests created by a user of the UE device.

8. The method of claim 1, further comprising adjusting, by the data processing hardware, the binge data threshold associated with the data usage category of the UE device based on a data connection type of the UE device.

9. The method of claim 8, wherein the data connection type of the UE device comprises the UE device tethered to another device.

10. The method of claim 1, further comprising adjusting, by the data processing hardware, the binge data threshold associated with the data usage category of the UE device based on an application currently executing on the UE device.

11. The method of claim 1, further comprising adjusting, by the data processing hardware, the binge data threshold associated with the data usage category of the UE device based on a location of the UE device.

12. The method of claim 1, further comprising adjusting, by the data processing hardware, the binge data threshold associated with the data usage category of the UE device based on nearby Wi-Fi networks that are commonly used by the UE device.

13. The method of claim 1, further comprising, after instructing the UE device to output the notification:
    receiving, at the data processing hardware, a notification snooze request from a user of the UE device; and
    in response to receiving the notification snooze request, delaying, by the data processing hardware, output of notifications by the UE device for a notification delay threshold period of time.

14. The method of claim 1, further comprising adjusting, by the data processing hardware, the binge data threshold associated with the data usage category of the UE device based on inputs received from a user of the UE device.

15. The method of claim 1, further comprising transmitting, by the data processing hardware, an indication that the amount of the data consumed by the UE device over the cellular network may be accidental to a remote system.

16. The method of claim 15, wherein the remote system is another UE device.

17. A system comprising:
    data processing hardware of a user equipment (UE) device; and
    memory hardware in communication with the data processing hardware, the memory hardware storing instructions that when executed on the data processing hardware cause the data processing hardware to perform operations comprising:
        obtaining a data usage category of the UE device based on historical data usage for the UE device over a cellular network, the data usage category associated with a binge data threshold, the binge data threshold indicating an uncharacteristically excessive amount of data consumed over the cellular network relative to the historical data usage for the UE device over the cellular network;
        receiving an amount of data consumed by the UE device over the cellular network;
        determining whether the amount of the data consumed by the UE device over the cellular network within a threshold period of time satisfies the binge data threshold; and
        when the amount of the data consumed by the UE device over the cellular network within the threshold period of time satisfies the binge data threshold:
            determining that the amount of the data consumed by the UE device over the cellular network within the threshold period of time may be accidental; and
            instructing the UE device to output a notification, the notification indicating that the amount of the data consumed by the UE device over the cellular network may be accidental.

18. The system of claim 17, wherein obtaining the data usage category of the UE device comprises executing a data monitor on the data processing hardware, the data monitor configured to:
    select the data usage category of the UE device based on an amount of historical data consumed by the UE device over the cellular network within a predetermined period of time, the data usage category selected from a tiered group of two or more data usage categories, each data usage category in the tiered group of the two or more data usage categories is associated with a corresponding range of data consumption and a corresponding binge data threshold; and
    identify the corresponding binge data threshold associated with the selected data usage category.

19. The system of claim 18, wherein data usage categories in the tiered group of the two or more data usage categories associated with higher corresponding ranges of data consumption are associated with higher corresponding binge data thresholds than data usage categories in the tiered group of the two or more data usage categories associated with lower corresponding ranges of data consumption.

20. The system of claim 18, wherein the predetermined period of time is greater than the threshold period of time.

21. The system of claim 17, wherein the operations further comprise, when the amount of the data consumed by the UE device over the cellular network within the threshold period of time satisfies the data binge threshold, throttling bandwidth of the data consumed by the UE device over the cellular network.

22. The system of claim 21, wherein the operations further comprise receiving an indication of consent to throttling from a user of the UE device.

23. The system of claim 17, wherein the operations further comprise determining an accuracy of the binge data threshold based on at least one of a number determined accidental data usages or a number of support requests created by a user of the UE device.

24. The system of claim 17, wherein the operations further comprise adjusting the binge data threshold associated with the data usage category of the UE device based on a data connection type of the UE device.

25. The system of claim 24, wherein the data connection type of the UE device comprises the UE device tethered to another device.

26. The system of claim 17, wherein the operations further comprise adjusting the binge data threshold associated with the data usage category of the UE device based on an application currently executing on the UE device.

27. The system of claim 17, wherein the operations further comprise adjusting the binge data threshold associated with the data usage category of the UE device based on a location of the UE device.

28. The system of claim 17, wherein the operations further comprise adjusting the binge data threshold associated with the data usage category of the UE device based on nearby Wi-Fi networks that are commonly used by the UE device.

29. The system of claim 17, wherein the operations further comprise, after instructing the UE device to output the notification:
    receiving a notification snooze request from a user of the UE device; and
    in response to receiving the notification snooze request, delaying output of notifications by the UE device for a notification delay threshold period of time.

30. The system of claim 17, wherein the operations further comprise adjusting the binge data threshold associated with the data usage category of the UE device based on inputs received from a user of the UE device.

31. The system of claim 17, further comprising transmitting an indication that the amount of the data consumed by the UE device over the cellular network may be accidental to a remote system.

32. The system of claim 31, wherein the remote system is another UE device.

* * * * *